United States Patent [19]

Igarashi

[11] 4,372,416

[45] Feb. 8, 1983

[54] TRICYCLE VEHICLE

[75] Inventor: Nihaku Igarashi, Shizuoka, Japan

[73] Assignee: Yamaha Hatsudoki Kabushiki Kaisha, Iwata, Japan

[21] Appl. No.: 184,652

[22] Filed: Sep. 5, 1980

[30] Foreign Application Priority Data

Sep. 14, 1979 [JP] Japan .................................. 54-118087

[51] Int. Cl.³ ............................................. B62J 25/00
[52] U.S. Cl. .................................... 180/215; 280/291
[58] Field of Search ................ 280/291; 180/210, 215, 180/216, 217, 218, 219; D12/85, 112

[56] References Cited

U.S. PATENT DOCUMENTS

| 3,193,039 | 7/1965 | Sutton | 180/210 |
| 3,212,596 | 10/1965 | Johnson | 180/291 X |
| 3,776,353 | 12/1973 | Roth | 180/215 |

Primary Examiner—John A. Pekar
Attorney, Agent, or Firm—Donald D. Mon

[57] ABSTRACT

A tricycle vehicle having a forward wheel, two rear drive wheels, an engine driving said wheels, and a seat, all mounted to a body. A foot rest protrudes from each side of the body. The seat extends forwardly of the foot rests, and the crankcase of the engine is disposed rearwardly of the foot rests.

1 Claim, 2 Drawing Figures

TRICYCLE VEHICLE

FIELD OF THE INVENTION

The present invention relates to tricycle vehicles of the type having one steering wheel at the front side of its body and two drive wheels at the back side, and particularly to means for mounting the rider.

BACKGROUND OF THE INVENTION

Generally speaking, tricycle vehicles are sometimes run on unpaved land such as a sandy land or a field, as well as on smooth paved surfaces. Also when the tricycle vehicle runs uphill or climbs a hill, its driver must shift his weight forward along the vehicular body to accordingly shift the center of gravity forward so that the vehicle may be held stable.

In tricycle vehicles according to the prior art, however, the front edge of a seat is extended only as far as a position generally above the foot rests, and a fuel tank is disposed one step above the front of the seat's front edge. Consequently, the driver has found it difficult to shift his weight forward, in order to take a proper driving position in accordance with the road condition. Since, moreover, an engine has its crankcase disposed inside of the foot rests, the width defined by the foot rests becomes excessive. As a result, the driver sometimes cannot fix his lower body in a proper position. Still worse, especially in the case of runs on a field, the foot rests may strike rocks or other impediments of the road, thereby threatening the running stability of the vehicle.

BRIEF DESCRIPTION OF THE INVENTION

The present invention has been conceived in view of the background thus far described and contemplates to provide a tricycle vehicle which allows the driver to select his driving position freely in accordance with the road condition, and which is especially good in providing driving stability on unpaved land. This is accomplished by extending the seat forwardly of the foot rests, and disposing the crankshaft rearwardly of the foot rests.

The present invention will now be described in connection with one embodiment thereof with reference to the accompanying drawings, in which:

DETAILED DESCRIPTION OF THE INVENTION

Figure 1:
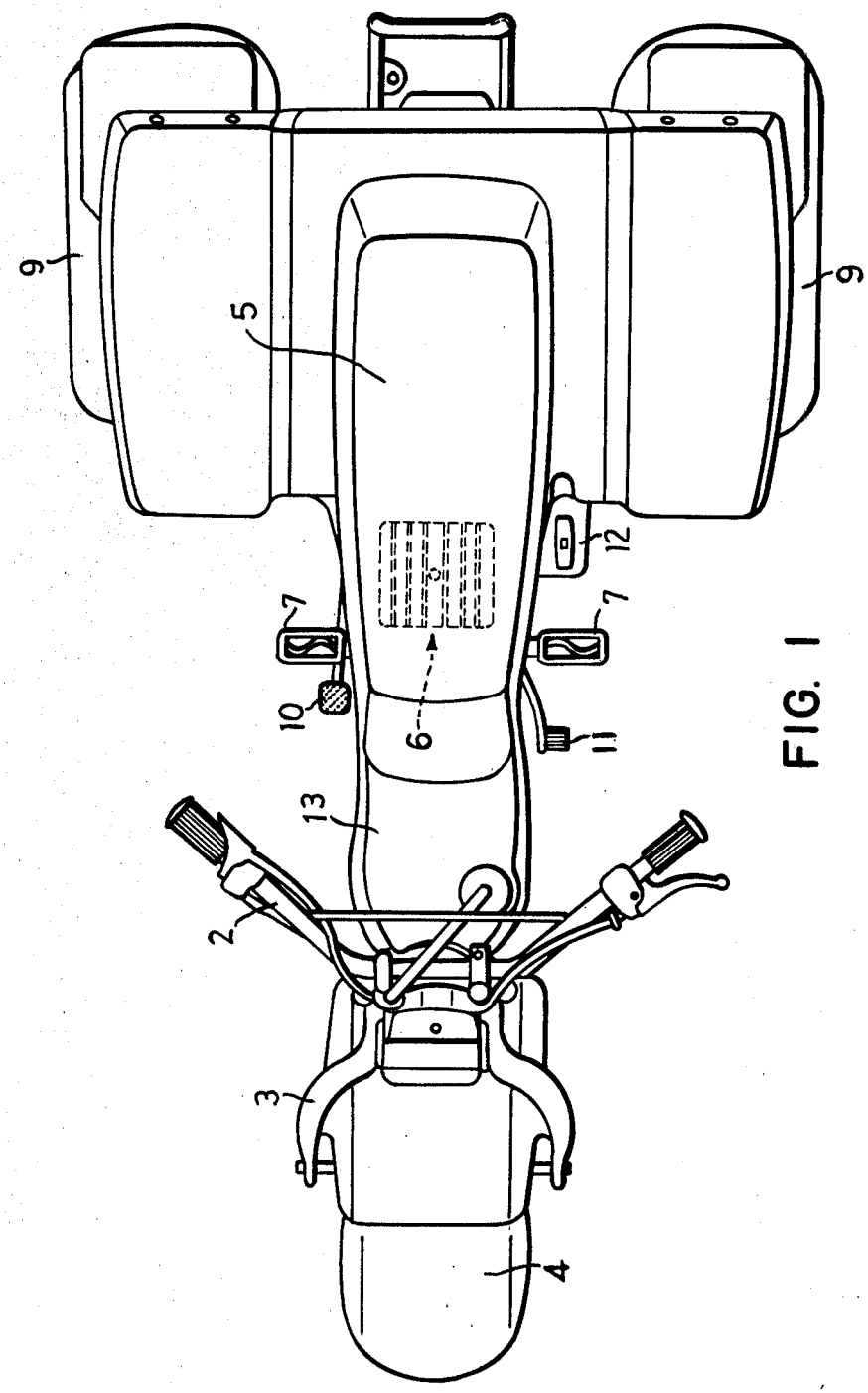
FIG. 1 is a top view of a tricycle vehicle according to the invention.
Figure 2:
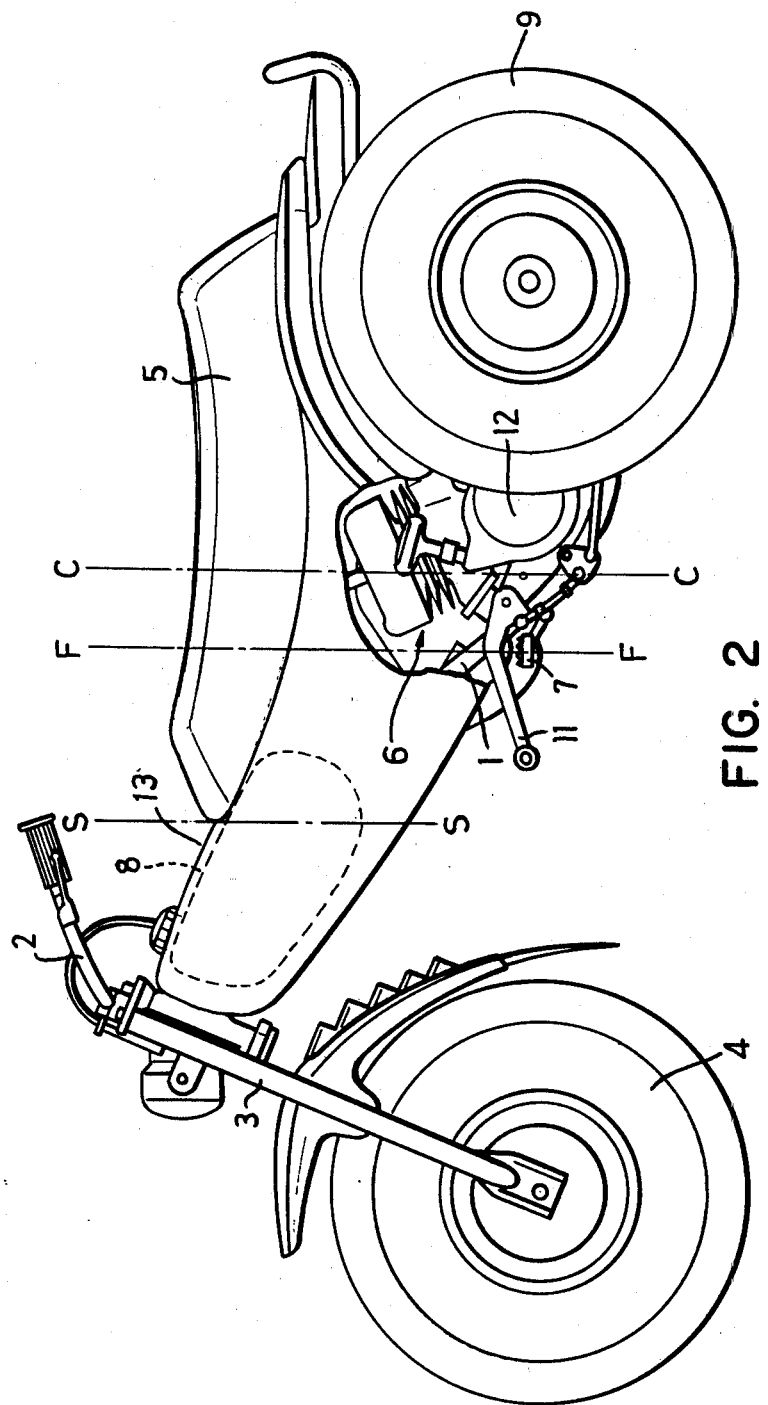
FIG. 2 is a side elevation of FIG. 1

In the drawings, a frame 1 is shown, to the front end of which is attached a front fork 3 steered by a handle 2. One steering wheel 4 is pivotally borne at the lower end portion of front fork 3. To the aforementioned frame 1, there is attached through a cowling 13 a seat 5, below which is carried an engine 6. To both sides of frame 1, there is attached a respective foot rest 7, which protrude sideways. In front of seat 5, there is disposed a fuel tank 8 which is mounted in the cowling 13 in a manner not to protrude upward from seat 5. To the rear end of the frame 1 there are pivotally borne two drive wheels 9 which are disposed at opposite sides of frame 1, so that they are rotationally driven by the engine. A brake pedal 10 and a shift pedal 11 are shown. The wheels all use balloon tires.

Now, the front edge of seat 5 is extended, as indicated at line S—S, to the front of the position (line F—F) where the foot rests 7 are attached, all with respect to the frame 1. Engine 6 is arranged so that its crankcase 12 has its front edge located rearwardly from line F—F of foot rests 7 (indicated at line C—C), all with respect to the frame 1. As a result, the center of gravity of the tricycle thus constructed is located at a relatively rearward position along frame 1.

Thus, according to the illustrated preferred embodiment of the invention having the construction thus far described, the front edge of the seat 5 is extended forwardly of foot rests 7 with respect to the frame 1. During a hill-climbing run, for instance, the driver can promptly shift his weight forward without being required to take a large action such as springing to his feet on the foot rests 7. As a result, the driver can smoothly take a proper driving position for the road condition and the desired excellent driving stability can be attained.

During a run on level land, on the other hand, the front end position of the extended seat 5 can be held by the knees of the driver, i.e., knee-gripped, so that the drivability on a road having small undulations can be improved. Moreover, since the crankcase 12 of engine 6 is disposed at the back of the foot rests 7 with respect to the frame 1, foot rests 7 can be attached directly to the frame 1, and the protrusions of the foot rests 7 sideways of the vehicular body can be limited so that the surroundings of the foot rests 7, i.e., the feet of the driver, can be simplified. As a result, not only the lower body of the driver is fixed in position, but also the risks of the foot rests 7 being attacked by rocks or the protrusions of the road are so reduced as to provide advantage for running on unpaved roads. Even if frame 1 is banked during cornering, the risk of the foot rests 7 striking the ground or an obstruction is also reduced to provide for excellent driving stability under any running condition.

In addition, since engine 6 is disposed at the back of frame 1, the center of gravity of the vehicle is shifted to a relatively rear position of the frame so that the weight of the vehicle is borne mainly on the pair of drive wheels 9. As a result, not only is the stability improved, but also the steering force required to turn steering wheel 4 is reduced. Also, since the center of gravity is located at a rear position, the driving force of the engine 6 is very efficiently transmitted to drive wheels 9, and at the same time the gripping performance of the drive wheels 9 is improved so that the traction for an unpaved road can be increased, thereby to attain an excellent traction force.

As has been described, according to the present invention, the front edge of the seat is extended forwardly of the foot rests with respect to the vehicular body, and the crankcase of the engine is disposed rearwardly of the foot rests. As a result, the driver can promptly shift his weight on the forwardly extended seat, when he intends to do so, so that he can smoothly take the proper driving position for the road conditions. During the run on a level road, on the other hand, the extended front end portion of the seat can be knee-gripped to attain excellent driving stability. Since, moreover, the foot rests are disposed in front of the engine, their protrusions sideways of the vehicular body can be reduced to a small dimension, free of limitation by the width of the engine. As a result, the risk of the foot rests being attacked by the protrusions from the unpaved road is accordingly reduced, and the risk of the foot rests striking an object on the ground is also reduced, even if the vehicular body as a whole is banked during the cornering, so that excellent drivability can be attained under any running condition. Still moreover, because the engine is disposed at a relatively rearward position, the center of gravity of the body is located toward the rear so that the weight of the body is largely borne on the two drive wheels. As a result, the stability is improved, and the steering force needed for the steering wheel is reduced. As an additional advantage, the traction on an unpaved road is increased so that excellent tractability can be attained.

This invention is not to be limited by the embodiment shown in the drawings and described in the description, which is given by way of example and not of limitation, but only in accordance with the scope of the appended claims.

I claim:

1. In a tricycle vehicle of the type which has a body, a forward wheel mounted to a steering post, two rear wheels, an engine forwardly of the axis of said rear wheels drivingly engaged to said rear wheels, a foot rest projecting from each side of the body, and a seat for the driver, the improvement comprising extending said seat substantially forward of said foot rests, and locating the crankcase of said engine rearwardly of said foot rest, said seat having a seat surface extending for a substantial distance along and upon which the driver can stably rest at a plurality of locations, with his feet on the foot rests, in a posture resembling the rider of a horse, without impediment by the steering post, there being a sufficient vertical spacing between the seat and the footrests to accommodate for such a posture.

* * * * *